United States Patent
Wong et al.

(10) Patent No.: US 7,030,046 B2
(45) Date of Patent: Apr. 18, 2006

(54) MULTI-LAYER SUBSTRATE FOR A PREMOISTENED WIPE CAPABLE OF CONTROLLED FLUID RELEASE

(75) Inventors: Arthur Wong, West Chester, OH (US); Jeffrey Lawrence Flora, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 128 days.

(21) Appl. No.: 09/998,806

(22) Filed: Nov. 1, 2001

(65) Prior Publication Data

US 2002/0155772 A1 Oct. 24, 2002

Related U.S. Application Data

(60) Provisional application No. 60/244,955, filed on Nov. 1, 2000.

(51) Int. Cl.
 *B32B 27/00* (2006.01)
(52) U.S. Cl. ............... 442/154; 442/385; 442/387; 442/399; 442/389; 442/381; 15/1; 15/209.1
(58) Field of Classification Search ............ 442/154, 442/381, 385, 387, 388, 389; 15/1, 209.1
 See application file for complete search history.

(56) References Cited

U.S. PATENT DOCUMENTS

| 3,855,046 | A | | 12/1974 | Hansen et al. |
|---|---|---|---|---|
| 3,954,642 | A | | 5/1976 | Schwuger |
| 4,837,078 | A | * | 6/1989 | Harrington ................. 442/334 |
| 4,853,281 | A | * | 8/1989 | Win et al. .................. 442/118 |
| 5,178,932 | A | | 1/1993 | Perkins et al. |
| 5,421,898 | A | | 6/1995 | Cavanagh |
| 5,507,968 | A | | 4/1996 | Palaikis |
| 5,656,361 | A | | 8/1997 | Vogt et al. |
| 5,962,112 | A | | 10/1999 | Haynes et al. |
| 6,028,018 | A | * | 2/2000 | Amundson et al. ......... 442/381 |
| 6,093,665 | A | | 7/2000 | Sayovitz et al. |
| 6,548,136 | B1 | * | 4/2003 | Piccini et al. ................ 428/43 |

FOREIGN PATENT DOCUMENTS

| JP | 2000080522 A | * | 3/2000 |
|---|---|---|---|
| WO | WO00/56201 | | 9/2000 |

* cited by examiner

*Primary Examiner*—Elizabeth M. Cole
(74) *Attorney, Agent, or Firm*—Thibault Fayette; Jason J. Camp (57) ABSTRACT

Multi-layer substrates for a premoistened wipe capable of controlled fluid release comprise a reservoir layer and a surface contact layer, wherein the reservoir and surface contact layers have certain blends of hydrophilic and hydrophobic fibers, as well as certain basis weights. Premoistened wipes for treating and/or cleaning a surface comprise the multi-layer substrate and a liquid composition impregnated into the multi-layer substrate, wherein the liquid composition comprises a surfactant system and/or a solvent system. Methods of treating and/or cleaning a surface comprise the step of contacting the surface with a premoistened wipe of the present invention.

16 Claims, 3 Drawing Sheets

MULTI-LAYER SUBSTRATE FOR A PREMOISTENED WIPE CAPABLE OF CONTROLLED FLUID RELEASE

This Application claim the benefit of Provisional Application No. 60/244,955, filed Nov. 1, 2002.

TECHNICAL FIELD

The present invention relates to substrates capable of controlled fluid release that are suitable for incorporation in a premoistened wipe. The invention further relates to premoistened wipes comprising the substrates containing a liquid composition incorporated therein.

BACKGROUND OF THE INVENTION

Premoistened wipes for cleaning surfaces are known in the art. For example, U.S. Pat. No. 3,954,642 discloses a textile fibrous structure suitable for cleaning purposes and impregnated with surface active agents, in which the textile fibrous structures are built up from water-insoluble high polymers with a content of carboxyl groups able to form salts, which are present substantially as free carboxyl groups, and the impregnation consists of at least one non-ionic surface-active agent from the group of water-soluble alkylene oxide derivatives. However, such textile fibrous structures, when subjected to pressure, quickly releases the composition incorporated therein, which reduces the overall area able to be cleaned by the wipe, due to the earlier premature release of the cleaning fluid. Therefore, when the composition is release too quickly from the substrate, the cleaning wipe is only able to clean relatively small areas before running out of cleaning solution.

Some developments have focused on providing a substrate for a premoistened wipe that will provide controlled release of fluid from the premoistened wipe. For example, U.S. Pat. No. 5,507,968 discloses a cleansing article that comprises a porous pad that includes a controlled detergent release composition comprising a polyacrylamide polymer and a detergent. The polyacrylamide polymer is a water swellable polymer. In use, the polyacrylamide polymer swells and slowly dissolves to provide a controlled release of the detergent incorporated therein. However, such polymers tend to cause filming and streaking problems, especially on hard surfaces.

U.S. Pat. No. 5,421,898 discloses an element for controlled release of a quaternary ammonium disinfectant in aqueous solution comprising a substrate coated with the residue of an aqueous composition of a certain water soluble polymer and a quaternary ammonium disinfectant. The water soluble polymer has a molecular weight of 85,000 to 186,000 and a degree of hydrolysis of 87 to 89 percent. The aqueous composition of the water soluble polymer and quat is applied to the substrate and dried, leaving a residue on the substrate. The water soluble polymer binds the quat to the substrate and releases the quat when the substrate is wetted. Thus, the wipe disclosed is a dry wipe, as opposed to a premoistened wipe.

Airlaid substrates have previously been utilized in premoistened wipes. Such airlaid substrates can exhibit some controlled fluid release properties. However, such substrates typically contain a binder material in order to bond the fibers of the substrate together. Binder materials can be undesireable because they can cause problems such as filming and streaking, especially on hard surfaces. Another potential problem with airlaid substrates that contain binders in premoistened wipes relates to the potential of the binder to decompose, depending on the liquid composition impregnated into the substrate, and thus cause the substrate to break apart over time.

It has therefore been desired to develop a substrate for a premoistened wipe that is capable of controlled fluid release, without having to utilize materials such as water swellable polymers and the like, while minimizing filming and streaking, especially on hard surfaces.

SUMMARY OF THE INVENTION

The present invention encompasses multi-layer substrates that are suitable for use in a premoistened wipe capable of controlled fluid release for treating or cleaning surfaces. The multi-layer substrates of the present invention generally comprise:

(a) at least one reservoir layer; wherein a first reservoir layer has a basis weight of at least about 5 gsm and comprises:
  (i) from about 5% to about 100%, by weight of said first reservoir layer, of hydrophilic fibers; and
  (ii) from about 0% to about 95% by weight of said first reservoir layer, of hydrophobic fibers;
  wherein the total basis weight of said reservoir layer(s) is from about 10% to about 95% of the total basis weight of said multi-layer substrate; and
(b) at least one surface contacting layer; wherein a first surface contacting layer has a basis weight of at least about 5 gsm and comprises:
  (i) from about 0% to about 95%, by weight of said first surface contacting layer, of hydrophilic fibers; and
  (ii) from about 5% to about 100%, by weight of said first surface contacting layer, of hydrophobic fibers;
  wherein the total basis weight of said surface contacting layer(s) is from about 10% to about 95% of the total basis weight of said multi-layer substrate.

The reservoir layer(s) and surface contact layer(s) have certain blends of hydrophilic fibers and hydrophobic fibers, as well as certain basis weights, in order to provide a substrate that is capable of controlled fluid release.

The present invention further relates to premoistened wipes comprising the multi-layer substrates herein and a composition comprising a surfactant system, wherein the surfactant system comprises a surfactant selected from the group consisting of anionic surfactants, nonionic surfactants, amphoteric surfactants, zwitterionic surfactants, and mixtures thereof.

The present invention further relates to methods of treating or cleaning a surface, especially hard surfaces, with the premoistened wipes of the present invention.

DETAILED DESCRIPTION OF THE INVENTION

I. Substrates

The substrates of the present invention are particularly suitable for use in premoistened wipes. It has been found that the present substrates used in premoistened wipes are capable of controlled fluid release. Substrates, especially in premoistened wipes, that are capable of controlled fluid release provide several benefits that are important to consumers. For example, the wipe is able to clean larger surface areas because the cleaning solution is more efficiently distributed to the cleaning surface and is not unnecessarily wasted. This provides added value to the consumer. Another benefit of substrates for premoistened wipes capable of controlled fluid release is that the wipes do not feel as wet initially to the touch and, therefore, are aesthetically more pleasing to a consumer since it does not get a consumer's hands as wet while using the wipe for cleaning surfaces.

An additional benefit relates to such premoistened wipes that are packaged in, for example, stacks and stored for a period of time. The lotion/fluid impregnated into the present substrates is able to be held at substantially a uniform level, so that the wipes maintain the correct amount of lotion in each wipe, even under forces such as gravity over time.

It has been found that a multi-layer substrate comprising a reservoir layer and a surface contact layer, wherein the reservoir layer and surface contact layer have certain blends of hydrophilic and hydrophobic fibers, can exhibit improved controlled fluid release. Also, the layers can have differing basis weights to further improve the controlled fluid release properties of the substrate.

The present substrates comprise a reservoir layer and at least one surface contacting layer, preferably at least two surface contacting layers. The reservoir and surface contacting layers have specific fiber blends and basis weights relatively to one another that result in a substrate suitable for use in premoistened wipes having controlled fluid release properties.

This controlled fluid release is achieved preferably without the use of water swellable polymers. Therefore, the substrates and premoistened wipes of the present invention are preferably essentially free of, or free of, water swellable polymers. In contrast to using such polymers, controlled fluid release herein is achieved by carefully selecting the hydrophilic/hydrophobic fiber blends and basis weights of the layers of the multi-layer substrates of the present invention.

Therefore, the substrates of the present invention, when used in premoistened wipes, are much more efficient in regard to fluid delivery and thus allow a consumer to maximize the use of the lotion impregnated on such substrates.

The multi-layer substrates herein relate to substrates with layers having certain blends of hydrophilic fibers and hydrophobic fibers.

As used herein, the term "hydrophilic" describes fibers, or surfaces of fibers, that are wettable by aqueous fluids (e.g., aqueous body fluids) deposited on these fibers. Hydrophilicity and wettability are typically defined in terms of contact angle and the surface tension of the fluids and solids involved. This is discussed in detail in the American Chemical Society publication entitled Contact Angle, Wettability and Adhesion, edited by Robert F. Gould (Copyright 1964). A fiber, or surface of a fiber, is said to be wetted by a fluid (i.e., hydrophilic) when either the contact angle between the fluid and the fiber, or its surface, is less than 90°, or when the fluid tends to spread spontaneously across the surface of the fiber, both conditions normally co-existing. Conversely, a fiber or surface is considered to be hydrophobic if the contact angle is greater than 90° and the fluid does not spread spontaneously across the surface of the fiber.

Suitable hydrophilic fibers for use in the present invention include cellulosic fibers, modified cellulosic fibers, cotton, reconstituted or regenerated cellulosic fibers (e.g. rayon and lyocell fibers), hydrophilic nylon fibers (HYDROFIL®), polylactic acid fibers, and the like. Suitable hydrophilic fibers can also be obtained by hydrophilizing hydrophobic fibers, such as surfactant-treated or silica-treated thermoplastic fibers derived from, for example, polyolefins. Other hydrophilic fibers that can be used in the present substrates include "chemically stiffened cellulosic fibers", which are described in detail in U.S. Pat. No. 5,855,572, which is incorporated herein by reference. Other hydrophilic fibers include "capillary channel fibers" such as those described in U.S. Pat. No. 5,200,248, to Thompson et al. and U.S. Pat. No. 5,268,229, to Phillips et al, both of which are incorporated by reference herein.

Suitable hydrophobic fibers utilized in the layers of the present substrates include, for example, synthetic fibers comprised of polyethylene, polypropylene, polyethylene terephthalate ("PET"), nylon, bicomponent fibers, or blends thereof.

A. Reservoir Layer

The reservoir layer of the present substrate is designed to store a composition to be applied to a given surface, until it is desired to treat the surface. The reservoir layer is designed to have the ability to deliver the right amount of lotion (i.e. cleaning solution or composition) to the surface being treated or cleaned. If too much lotion is released, the lotion will be wasted and the premoistened wipe will not last long before running out of lotion. If too much lotion remains in the reservoir layer, then the lotion is not available to act upon the treated surface, thus wasting lotion since it is not being utilized to treat the surface. The reservoir layer therefore must be carefully designed to deliver an appropriate amount of composition to the surface to be treated.

As previously discussed, the layers of the multi-layer substrates herein comprise differing blends of hydrophilic and hydrophobic fibers. It has been found that the hydrophilic:hydrophobic fiber blend of the reservoir layer (and also the surface contact layer(s)) can be balanced in order to result in a substrate that is useful in premoistened wipes capable of controlled fluid release.

The reservoir layer herein typically comprises at least about 5%, preferably at least about 25%, and more preferably at least about 40%, by weight of the reservoir layer, of hydrophilic fibers; and typically less than about 100%, preferably less than about 80%, and more preferably less than about 50%, by weight of the reservoir layer, of hydrophilic fibers.

The reservoir layer herein typically further comprises at least about 0%, preferably at least about 20%, and more preferably at least about 50%, by weight of the reservoir layer, of hydrophobic fibers; and typically less than about 95%, preferably less than about 75%, and more preferably less than about 60%, by weight of the reservoir layer, of hydrophobic fibers.

The reservoir layer herein will also generally have a basis weight of at least about 5 grams per square meter ("gsm"), preferably at least about 15 gsm, and more preferably at least about 25 gsm. The basis weight of the reservoir layer will typically account for at least 10%, preferably at least about 20%, and more preferably at least about 35% of the total basis weight of the present substrate; and typically less than about 95%, preferably less than about 80%, and more preferably less than about 60% of the total basis weight of the present substrate.

The density of the reservoir layer will typically be from about 0.02 grams per cubic centimeter ("g/cc") to about 0.4 g/cc, preferably from about 0.05 g/cc to about 0.2 g/cc, and more preferably from about 0.075 g/cc to about 0.15 g/cc.

B. Surface Contact Layer

The surface contact layer is designed to complement the reservoir layer in terms of delivering the lotion to the surface to be treated. The surface contact layer also has capacity to store a composition, such as in a premoistened wipe, although generally having a lesser fluid-holding capacity than the reservoir layer. Also, the surface contacting layer can provide other benefits such as enhancing the soil cleaning ability of the substrate and the dust, dirt, and/or hair pick-up of the substrates, and the premoistened wipes that incorporate the present substrates.

The surface contact layer is designed with a certain blend of hydrophilic and hydrophobic fibers such that, when combined with the reservoir layer to form a multi-layer substrate, the substrate is capable of controlled fluid release.

The surface contact layer herein typically comprises at least about 0%, preferably at least about 10%, and more preferably at least about 20%, by weight of the surface contact layer, of hydrophilic fibers; and typically less than about 95%, preferably less than about 75%, and more preferably less than about 50%, by weight of the surface contact layer, of hydrophilic fibers.

The surface contact layer herein typically further comprises at least about 5%, preferably at least about 25%, and more preferably at least about 50%, by weight of the surface contact layer, of hydrophobic fibers; and typically less than about 100%, preferably less than about 90%, and more preferably less than about 80%, by weight of the surface contact layer, of hydrophobic fibers.

The surface contact layer herein will also generally have a basis weight of at least about 5 gsm, preferably at least about 10 gsm, and more preferably at least about 20 gsm. The basis weight of the surface contact layer will typically account for at least 10%, preferably at least about 20%, and more preferably at least about 35% of the total basis weight of the present substrate; and typically less than about 95%, preferably less than about 80%, and more preferably less than about 60% of the total basis weight of the present substrate.

The density of the surface contact layer will typically be from about 0.02 g/cc to about 0.4 g/cc, preferably from about 0.05 g/cc to about 0.2 g/cc, and more preferably from about 0.075 g/cc to about 0.15 g/cc.

In a preferred embodiment, the multi-layer substrate of the present invention will comprise a first surface contact layer, a second surface contact layer, and a reservoir layer, wherein the reservoir layer is positioned between the first and second surface contact layers. Such a substrate thus comprises three layers. Preferably, such a multi-layer substrate is formed by thermal bonding together the three layers.

The multi-layer substrates of the present invention can encompass a wide range of total basis weight. In preferred embodiments, the ratio of the basis weight of the reservoir layer to the basis weight of surface contacting layer(s) will typically range from about 20:1 to about 1:20, preferably from about 5:1 to about 1:5, and more preferably from about 1.5:1 to about 1:1.5.

The substrates herein can be aperatured; however, the substrates are preferably non-apertured, especially if they are used in premoistened wipes.

The multi-layer substrates herein are comprised of at least two layers. Therefore, the present invention encompasses substrates having two layers, three layers, four layers, and so on. Preferably, the multi-layer substrate consists of three layers.

A variety of web forming technologies known in the art can be utilized to manufacture the reservoir and surface contact layers of the present substrates. Examples of suitable web forming processes include air laid, carded, cross lapped, spunbond, meltblown, wet laid, extruded, cast film, and combinations thereof. Preferably, the web forming technology used to manufacture the reservoir and surface contact layers herein is conventional carding technology. Thus the layers are preferably made of carded fibers.

In terms of combining the various layers herein to form the multi-layer substrate of the present invention, a variety of bonding technologies known in the art can be used to form the multi-layer substrates of the present invention. Examples of suitable bonding technologies include mechanically bonded, stitch bonded, needlepunched, needlefelted, spunlaced, jetlaced, hydroentangled, apertured, chemically bonded (resin, latex, powder), saturated, print bonded, spray bonded, foam bonded, thermal bonded, point bonded, ultrasonically welded, thermal bonded bicomponent fiber compositions, and combinations thereof. Preferably, the bonding technology utilized herein to combine the various layers of the present multi-layer substrate is thermal bonding. More preferably, the bonding technology is point thermal bonding, which results in an embossed pattern in the resulting multi-layer substrate. A preferred pattern is a 7-point pattern.

Preferably, the web forming technologies and bonding technologies utilized herein do not include binding materials that are incompatible with the compositions herein. Binding materials that are incompatible tend to decompose, dissolve, or disintegrate in the presence of the compositions herein. Thus the substrates herein preferably are essentially free of, or free of, such binders or binding agents. Examples of such binders include copolymers and latex-blends such as styrene-butadiene, polyvinyl acetate, polyvinyl alcohol, ethyl vinyl acetate, and the like. Such binders can be undesirable, especially in premoistened wipes, because they can cause filming and streaking problems on treated surfaces and can be subject to degradation over time (depending on the composition impregnated in the substrate), resulting in a weakening of the substrate of the premoistened wipe.

It is preferred that the various layers herein are bonded to one another via patterned thermal bonding. Patterned thermal bonding refers to a process of bonding a nonwoven web in a pattern by the application of heat and pressure. Pattern bonding typically is carded out at a temperature in a range of from about 80° C. to about 180° C. and a pressure in a range of from about 150 to about 1,000 pounds per linear inch (from about 59 to about 178 kg/cm). The pattern employed typically will have from about 10 to about 250 bonds/inch$^2$ (1–40 bonds/cm$^2$) covering from about 5 to about 30 percent of the wipe surface area. Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures, which patents are incorporated herein by reference.

Preferred Multi-Layer Substrate

Figure 1A:
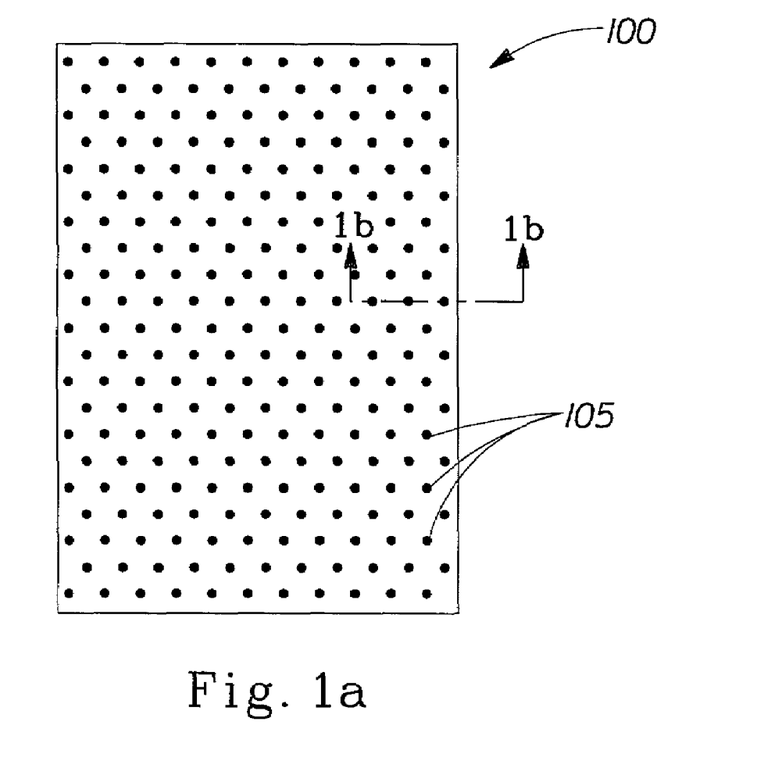
FIG. 1a is a top view of a substrate of the present invention.
Figure 1B:
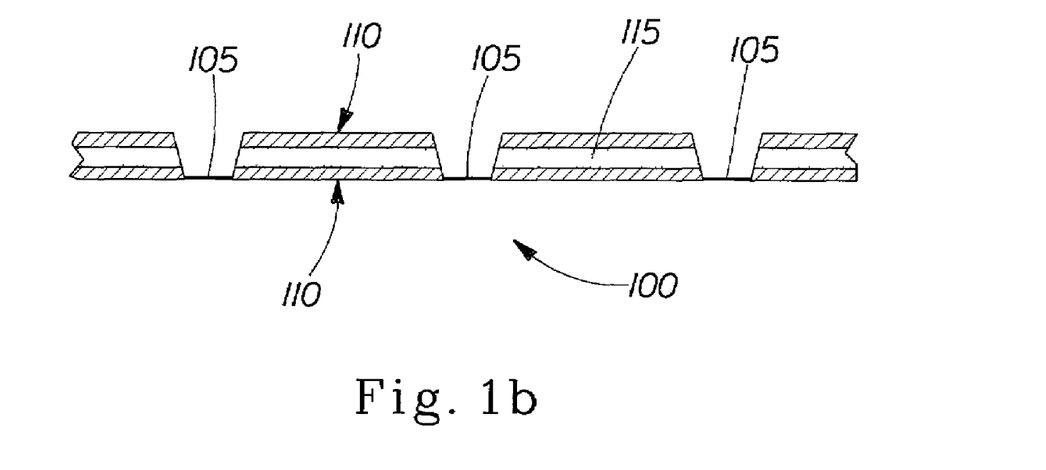
FIG. 1b is a cross-sectional view of the substrate shown in FIG. 1a along line B–B'.

A preferred multi-layer substrate of the present invention is shown in FIGS. 1a and 1b. This preferred substrate 100 is a carded thermal bonded nonwoven substrate comprising three carded fiber layers (two surface contact layers 110 and one reservoir layer 115, positioned between the two surface contact layers 110) thermally bonded together with a 7-point pattern and a total basis weight of 70 gsm. The overall fiber composition of this preferred substrate is about 52% hydrophilic polypropylene (2.2 denier per filament ("dpf"), 38 mm length, FiberVisions Americas Type 193), about 31% viscose rayon (1.5 dpf, 40 mm length, Acordis Cellulosic Fibers, Inc. T-1099), and about 18% PET (6.0 dpf, 50 mm, Wellman, Inc. Type 204). Average caliper for the composite web substrate is about 0.63 mm and it has a density of 0.108 g/cm$^3$.

The multi-layer substrate 100 is thermally bonded with a plurality of thermal point bonds 105. The thermal point bonds 105 form a continuous 7-point pattern. FIG. 1b depicts a cross-sectional view of the multi-layer substrate 100 shown in FIG. 1a. The two surface contact layers 110 are made of a homogenous blend of about 60% hydrophilic polypropylene (2.2 dpf, 38 mm length, FiberVisions Americas Type 193), about 10% viscose rayon (1.5 dpf, 40 mm length, Acordis Cellulosic Fibers, Inc. T-1099), and about 30% PET (6.0 dpf, 50 mm, Wellman, Inc. Type 204) and each surface contact layer 110 has a basis weight of about 20.5 gsm. The reservoir layer 115, positioned between the two surface contact layers 110, is made of a homogenous blend of about 40% hydrophilic polypropylene (2.2 dpf, 38 mm length, FiberVisions Americas Type 193) and about 60% viscose rayon (1.5 dpf, 40 mm length, Acordis Cellulosic Fibers, Inc. T-1099) with a basis weight of about 29.0 gsm.

The preferred multi-layer substrate shown in FIGS. 1a and 1b is made according to the following process. The reservoir layer 115 is made by blending (by weight) about 40% hydrophilic polypropylene (2.2 dpf, 38 mm length, FiberVisions Americas Type 193) and about 60% viscose rayon (1.5 dpf, 40 mm length, Acordis Cellulosic Fibers, Inc. T-1099). These blends are fed into two cards (about 14.5 gsm per card) to form a reservoir layer 115 with an overall basis weight of about 29.0 gsm. After carding, the reservoir layer 115 is embossed with a continuous 7-point pattern at about 300° F. and about 540 pounds per square inch ("psi") and wound for later use in forming the multi-layer substrate 100.

The two surface contact layers 110 are made by blending (by weight) of about 60% hydrophilic polypropylene (2.2 dpf, 38 mm length, FiberVisions Americas Type 193), about 10% viscose rayon (1.5 dpf, 40 mm length, Acordis Cellulosic Fibers, Inc. T-1099), and about 30% PET (6.0 dpf, 50mm, Wellman, Inc. Type 204). These blends are fed into two cards (top and bottom, about 20.5 gsm per card). In forming the multi-layer substrate 100:(1) the bottom carded fiber layer is placed on a moving conveyor, (2) the pre-made center reservoir layer is unwound on top of the bottom carded fiber layer, and (3) the top carded fiber layer is placed on top of the pre-formed center web and the bottom carded fiber layer. These three fibrous web layers are thermally embossed together with a continuous 7-point pattern at about 300° F. and about 540 psi. The resultant web formed has an average basis weight of about 70 gsm, an average caliper of about 0.63 mm, and an average density of about 0.108 g/cm$^3$.

II. Composition

The composition of the present invention for incorporation onto a substrate of the present invention is preferably suitable for use as a cleaning and/or disinfecting composition. The compositions may be formulated in any suitable form for example as a solid, paste or liquid. In the case where the compositions according to the present invention are formulated as solids, they can be applied to the substrate as a solid or alternatively can be mixed with an appropriate solvent, typically water, before application to the substrate. Where the composition is in liquid form, the compositions are preferably, but not necessarily, formulated as aqueous compositions. Liquid compositions are preferred herein for convenience of use.

The compositions herein generally comprise a surfactant system and/or a solvent system, and optional ingredients. The surfactant system preferably comprises a surfactant selected from the group consisting of anionic surfactants, nonionic surfactants, amphoteric surfactants, zwitterionic surfactants, and mixtures thereof. The solvent system preferably comprises a solvent or mixtures thereof.

In a preferred embodiment the liquid compositions according to the present invention are aqueous compositions typically comprising from 50% to 99.9%, by weight of the total composition, of water, preferably from 70% to 99%, and more preferably from 80% to 99%. These aqueous compositions preferably have a pH as is of not more than 13.0, more preferably from 1 to 11, and most preferably from 2 to 10. The pH of the compositions can be adjusted by using organic or inorganic acids, or alkalinising agents.

Suitable organic acids include citric acid, lactic acid and mixtures thereof. In a preferred embodiment of the present invention, the composition herein comprises an organic acid, preferably citric acid, lactic acid or a mixture thereof, and most preferably citric acid.

Compositions suitable for use as a cleaning composition preferably have pH in the range of from 5 to 13, more preferably from 7 to 13 and most preferably from 8 to 10. Compositions for use as disinfecting compositions preferably have a pH in the range of from 0 to 7, more preferably from 1 to 5 and most preferably from 2 to 4.

In another preferred embodiment according to the present invention, the liquid compositions herein are substantially free, preferably free, of pH modifying agents. Preferably, the compositions being substantially free, preferably free, of pH modifying agents have a pH of from 6.5 to 7.5, more preferably of from 6.8 to 7.2.

By "substantially free" it is meant herein, that the liquid composition comprises less than 1%, preferably less than 0.5%, more preferably less than 0.1%, and even more preferably less than 0.05%, by weight of the total composition of a pH modifying agent.

By "pH modifying agents" it is meant herein, ingredients solely added for the purpose of modifying the pH of the compositions described as for example acids, sources of alkalinity, buffers and the like and mixtures thereof.

By acids it is meant herein any organic acid, as for example, citric acid, maleic acid, lactic acid, glycolic acid, succinic acid, glutaric acid and adipic acid, and mixtures thereof and/or any inorganic acid, as for example, sulphuric acid, chloridric acid, phosphoric acid, nitric acid, and mixtures thereof. By sources of alkalinity for use herein are the caustic alkalis such as sodium hydroxide, potassium hydroxide and/or lithium hydroxide, and/or the alkali metal oxides such as sodium and/or potassium oxide, and/or other suitable sources of alkalinity including ammonia, ammonium carbonate and hydrogen carbonate.

It has been observed that when a substrate incorporating a liquid composition as described herein is used to clean and/or disinfect an animate or inanimate surface, wherein said liquid composition is substantially free, preferably free, of pH modifying agents, streaking and/or spotting benefits can be observed. Indeed, the absence of pH modifying agents in the liquid compositions herein can contribute to reduce or even prevent the formation of streaks and/or spots on a surface cleaned and/or disinfected with a substrate incorporating a liquid composition as described herein being substantially free of pH modifying agents as compared to a similar surface cleaned and/or disinfected with a substrate incorporating a liquid composition not being substantially free of pH modifying agents. By reducing or even preventing the formation of streaks and/or spots on said cleaned and/or disinfected surface, shine benefits are provided to said surface.

A. Surfactant System

According to the present invention, the premoistened wipes comprise a substrate incorporating a composition comprising a surfactant system. The surfactant system herein comprises a surfactant selected from the group consisting of anionic surfactants, nonionic surfactants, amphoteric surfactants, zwitterionic surfactants, and mixtures thereof. In a preferred embodiment, the surfactant system consists of a synergistic system comprising at least three surfactants, namely an anionic, a nonionic and an amphoteric and/or zwitterionic surfactant.

The compositions preferably comprises the surfactant system at a level by weight of the total composition of from 0.05–20%, more preferably from 0.1–5% and most preferably from 0.2–3%.

i. Anionic Surfactants

Suitable anionic surfactants for use herein include alkyl sulphates. Suitable alkyl sulphates for use herein include water-soluble salts or acids of the formula $ROSO_3M$ wherein R is a $C_6$–$C_{24}$ linear or branched, saturated or unsaturated alkyl group, preferably a $C_8$–$C_{20}$ alkyl group, more preferably a $C_8$–$C_{16}$ alkyl group and most preferably a $C_{10}$–$C_{14}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable anionic surfactants for use herein further include alkyl aryl sulphates. Suitable alkyl aryl sulphates for use herein include water-soluble salts or acids of the formula $ROSO_3M$ wherein R is an aryl, preferably a benzyl, substituted by a $C_6$–$C_{24}$ linear or branched saturated or unsaturated alkyl group, preferably a $C_8$–$C_{20}$ alkyl group and more preferably a $C_{10}$–$C_{16}$ alkyl group and M is H or a cation, e.g., an alkali metal cation (e.g., sodium, potassium, lithium, calcium, magnesium and the like) or ammonium or substituted ammonium (e.g., methyl-,dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable anionic surfactants for use herein further include alkoxylated sulphate surfactants. Suitable alkoxylated sulphate surfactants for use herein are according to the formula $RO(A)_mSO_3M$ wherein R is an unsubstituted $C_6$–$C_{24}$ alkyl, hydroxyalkyl or alkyl aryl group, having a linear or branched $C_6$–$C_{24}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy or butoxy unit or a mixture thereof, m is greater than zero, typically between 0.5 and 6, more preferably between 0.5 and 3, and M is H or a cation which can be, for example, a metal cation (e.g., sodium, potassium, lithium, calcium, magnesium, etc.), ammonium or substituted ammonium cation. Alkyl ethoxylated sulphates, alkyl butoxylated sulphates as well as alkyl propoxylated sulphates are contemplated herein. Specific examples of substituted ammonium cations include methyl-, dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulphate ($C_{12}$–$C_{18}$E(1.0)SM), $C_{12}$–$C_{18}$ polyethoxylate (2.25) sulphate ($C_{12}$–$C_{18}$E(2.25)SM), $C_{12}$–$C_{18}$ alkyl polyethoxylate (3.0) sulphate ($C_{12}$–$C_{18}$E(3.0)SM), and $C_{12}$–$C_{18}$ alkyl polyethoxylate (4.0) sulphate ($C_{12}$–$C_{18}$E(4.0)SM), wherein M is conveniently selected from sodium and potassium.

Suitable anionic surfactants for use herein further include alkyl sulphonates. Suitable alkyl sulphonates for use herein include water-soluble salts or acids of the formula $RSO_3M$ wherein R is a $C_6$–$C_{20}$ linear or branched, saturated or unsaturated alkyl group, preferably a $C_8$–$C_{18}$ alkyl group and more preferably a $C_{14}$–$C_{17}$ alkyl group, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Suitable anionic surfactants for use herein further include alkyl aryl sulphonates. Suitable alkyl aryl sulphonates for use herein include water-soluble salts or acids of the formula $RSO_3M$ wherein R is an aryl, preferably a benzyl, substituted by a $C_6$–$C_{20}$ linear or branched saturated or unsaturated alkyl group, preferably a $C_8$–$C_{18}$ alkyl group and more preferably a $C_9$–$C_{14}$ alkyl group, and M is H or a cation, e.g., an alkali metal cation (e.g., sodium, potassium, lithium, calcium, magnesium and the like) or ammonium or substituted ammonium (e.g., methyl-,dimethyl-, and trimethyl ammonium cations and quaternary ammonium cations, such as tetramethyl-ammonium and dimethyl piperdinium cations and quaternary ammonium cations derived from alkylamines such as ethylamine, diethylamine, triethylamine, and mixtures thereof, and the like).

Particularly suitable alkyl sulphonates include $C_{14}$–$C_{17}$ paraffin sulphonate like Hostapur® SAS commercially available from Hoechst. An example of commercially available alkyl aryl sulphonate is Lauryl aryl sulphonate from Su.Ma., Particularly preferred alkyl aryl sulphonates are alkyl benzene sulphonates commercially available under trade name Nansa® available from Albright&Wilson.

Suitable anionic surfactants for use herein further include alkoxylated sulphonate surfactants. Suitable alkoxylated sulphonate surfactants for use herein are according to the formula $R(A)_mSO_3M$ wherein R is an unsubstituted $C_6$–$C_{20}$ alkyl, hydroxyalkyl or alkyl aryl group, having a linear or branched $C_6$–$C_{20}$ alkyl component, preferably a $C_{12}$–$C_{20}$ alkyl or hydroxyalkyl, more preferably $C_{12}$–$C_{18}$ alkyl or hydroxyalkyl, A is an ethoxy or propoxy or butoxy unit, m is greater than zero, typically between 0.5 and 6, more preferably between 0.5 and 3, and M is H or a cation which can be, for example, a metal cation (e.g., sodium, potassium, lithium, calcium, magnesium, etc.), ammonium or substituted-ammonium cation. Alkyl ethoxylated sulphonates, alkyl butoxylated sulphonates as well as alkyl propoxylated sulphonates are contemplated herein. Specific examples of substituted ammonium cations include methyl-,dimethyl-, trimethyl-ammonium and quaternary ammonium cations, such as tetramethyl-ammonium, dimethyl piperdinium and cations derived from alkanolamines such as ethylamine, diethylamine, triethylamine, mixtures thereof, and the like. Exemplary surfactants are $C_{12}$–$C_{18}$ alkyl polyethoxylate (1.0) sulphonate ($C_{12}$–$C_{18}$E(1.0)SM), $C_{12}$–$C_{18}$ alkyl polyethoxylate (2.25sulphonate ($C_{12}$–$C_{18}$E(2.25)SM), $C_{12}$–$C_{18}$ alkyl polyethoxylate (3.0) sulphonate ($C_{12}$–$C_{18}$E(3.0)SM), and $C_{12}$–$C_{18}$ alkyl polyethoxylate (4.0) sulphonate ($C_{12}$–$C_{18}$E(4.0)SM), wherein M is conveniently selected from sodium and potassium. Particularly suitable alkoxylated sulphonates include alkyl aryl polyether sulphonates like Triton X-200® commercially available from Union Carbide.

Suitable anionic surfactants for use herein further include $C_6$–$C_{20}$ alkyl alkoxylated linear or branched diphenyl oxide disulphonate surfactants. Suitable $C_6$–$C_{20}$ alkyl alkoxylated linear or branched diphenyl oxide disulphonate surfactants for use herein are according to the following formula:

wherein R is a $C_6$–$C_{20}$ linear or branched, saturated or unsaturated alkyl group, preferably a $C_6$–$C_{18}$ alkyl group and more preferably a $C_6$–$C_{14}$ alkyl group, and X+ is H or a cation, e.g., an alkali metal cation (e.g., sodium, potassium, lithium, calcium, magnesium and the like). Particularly suitable $C_6$–$C_{20}$ alkyl alkoxylated linear or branched diphenyl oxide disulphonate surfactants to be used herein are the $C_{12}$ branched di phenyl oxide disulphonic acid and $C_{16}$ linear di phenyl oxide disulphonate sodium salt respectively commercially available by DOW under the trade name Dowfax 2A1® and Dowfax 8390®.

Other suitable anionic surfactants for use herein include alkyl-carboxylates. Other anionic surfactants can include salts (including, for example, sodium, potassium, ammonium, and substituted ammonium salts such as mono-, di- and triethanolamine salts) of soap, $C_8$–$C_{24}$ olefinsulfonates, sulfonated polycarboxylic acids prepared by sulfonation of the pyrolyzed product of alkaline earth metal citrates, e.g., as described in British Patent Specification No. 1,082,179; acyl glycerol sulfonates, fatty oleyl glycerol sulfates, alkyl phenol ethylene oxide ether sulfates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), acyl sarcosinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula RO($CH_2CH_2O$)$_k$$CH_2$COO-M+ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. 3,929,678, issued Dec. 30, 1975 to Laughlin, et al. at Column 23, line 58 through Column 29, line 23.

In one preferred embodiment, preferred anionic surfactants for use herein are the $C_8$–$C_{16}$ alkyl sulfonates, $C_8$–$C_{16}$ alkyl sulfates, including branched alkyl sulphates, $C_8$–$C_{16}$ alkyl alkoxylated sulfates (e.g., $C_8$–$C_{16}$ alkyl ethoxylated sulfates), $C_8$–$C_{16}$ alkyl alkoxylated sulphonates and mixtures thereof. Such anionic surfactants are preferred herein as it has been found that they contribute to the disinfecting properties of a disinfecting composition herein. For example, $C_8$–$C_{16}$ alkyl sulfate acts by disorganizing the bacteria cell membrane, inhibiting enzymatic activities, interrupting the cellular transport and/or denaturing cellular proteins. Indeed, it is speculated that the improved disinfecting performance further associated with the addition of an anionic surfactant, especially a $C_8$–$C_{16}$ alkyl sulfonate, a $C_8$–$C_{16}$ alkyl sulfate and/or a $C_8$–$C_{16}$ alkyl alkoxylated sulfate, in a composition according to the present invention, is likely due to multiple mode of attack of said surfactant against the bacteria.

In a second preferred embodiment, the anionic surfactant is selected from the group consisting of: $C_{6-24}$ alkyl sulphates; $C_{6-24}$ alkyl aryl sulphates; $C_{6-24}$ alkyl alkoxylated sulphates; $C_{6-24}$ alkyl sulphonates, including paraffin sulphonates; $C_{6-24}$ alkyl aryl sulphonates; $C_{6-24}$ alkyl alkoxylated sulphonates; $C_{6-24}$ alkyl alkoxylated linear or branched diphenyl oxide disulphonates; naphthalene sulphonates; and mixtures thereof. More preferably the anionic surfactant is selected from the group consisting of : $C_{6-24}$ alkyl sulphonates; $C_{6-24}$ alkyl sulphates; $C_{6-24}$ alkyl alkoxylated sulphates; $C_{6-24}$ alkyl aryl sulphonates; and mixtures thereof. Even more preferably the anionic surfactant for use herein is a paraffin sulphonate. Most preferably the anionic surfactant for use herein is a $C_{14}$–$C_{17}$ paraffin sulphonate.

In a third preferred embodiment the anionic surfactant is a branched alkyl sulphate surfactant. Branched alkyl sulphate is herein defined to mean a an alkyl sulfate comprising a sulfate group and a carbon chain of preferably from 2 to 20, more preferably from 2 to 16, most preferably from 2 to 8 carbon atoms. The carbon chain of the branched alkyl sulfate comprises at least one branching group attached to the carbon chain. The branching group is selected from the group consisting of an alkyl group having from 1 to 20 , more preferably from 1 to 10 and most preferably from 1 to 4 carbon atoms. The branching group may be located at any position along the alkyl chain of the branched alkyl sulfate. More preferably the branching group is located at position from 1 to 4 along the alkyl chain. The sulfate group can be at any point along the length of the alkyl chain, most preferable at a terminus.

Suitable preferred branched alkyl sulfates include those available from Albright & Wilson under the tradename Empicol 0585/A.

ii. Nonionic Surfactants

Suitable nonionic surfactants for use herein are fatty alcohol ethoxylates and/or propoxylates which are commercially available with a variety of fatty alcohol chain lengths and a variety of ethoxylation degrees. Indeed, the HLB values of such alkoxylated nonionic surfactants depend essentially on the chain length of the fatty alcohol, the nature of the alkoxylation and the degree of alkoxylation. Surfactant catalogues are available which list a number of surfactants, including nonionics, together with their respective HLB values. Preferred nonionic surfactants for one embodiment are those having an average HLB from 8 to 20, more preferably from 10 to 18, most preferably from 11 to 16. These hydrophobic nonionic surfactants have been found to provide good grease cutting properties.

Preferred hydrophobic nonionic surfactants for use in the compositions according to the present invention are surfactants having an HLB below 16 and being according to the formula RO—$(C_2H_4O)_n(C_3H_6O)_mH$, wherein R is a $C_6$ to $C_{22}$ alkyl chain or a $C_6$ to $C_{28}$ alkyl benzene chain, and wherein n+m is from 0 to 20 and n is from 0 to 15 and m is from 0 to 20, preferably n+m is from 1 to 15 and, n and m are from 0.5 to 15, more preferably n+m is from 1 to 10 and, n and m are from 0 to 10. The preferred R chains for use herein are the $C_8$ to $C_{22}$ alkyl chains. Accordingly, suitable hydrophobic nonionic surfactants for use herein are Dobanol® 91-2.5 (HLB=8.1; R is a mixture of C9 and $C_{11}$ alkyl chains, n is 2.5 and m is 0), or Lutensol® TO3 (HLB=8; R is a $C_{13}$ alkyl chains, n is 3 and m is 0), or Lutensol® AO3 (HLB=8; R is a mixture $C_{13}$ and $C_{15}$ alkyl chains, n is 3 and m is 0), or Tergitol® 25L3 (HLB=7.7; R is in the $C_{12}$ to $C_{15}$ alkyl chain length, n is 3 and m is 0), or Dobanol® 23-3 (HLB=8.1; R is a mixture of $C_{12}$ and $C_{13}$ alkyl chains, n is 3 and m is 0), or Dobanol® 23-2 (HLB=6.2; R is a mixture of $C_{12}$ and $C_{13}$ alkyl chains, n is 2 and m is 0), or Dobanol® 45-7 (HLB=11.6; R is a mixture of $C_{14}$ and $C_{15}$ alkyl chains, n is 7 and m is 0) Dobanol® 23-6.5 (HLB=11.9; R is a mixture of $C_{12}$ and $C_{13}$ alkyl chains, n is 6.5 and m is 0), or Dobanol® 25-7 (HLB=12; R is a mixture of $C_{12}$ and $C_{15}$ alkyl chains, n is 7 and m is 0), or Dobanol® 91-5 (HLB=11.6; R is mixture of $C_9$ and $C_{11}$ alkyl; chains, n is 5 and m is 0), or Dobanol® 91-6 (HLB=12.5; R is a mixture of $C_9$ and $C_{11}$ alkyl chains, n is 6 and m is 0), or Dobanol® 91-8 (HLB=13.7; R is a mixture of $C_9$ and $C_{11}$ alkyl chains, n is 8 and m is 0), Dobanol® 91-10 (HLB=14.2; R is a mixture of $C_9$ to $C_{11}$ alkyl chains, n is 10 and m is 0), or mixtures thereof. Preferred herein are Dobanol® 91-2.5, or Lutensol® TO3, or Lutensol® AO3, or Tergitol® 25L3, or Dobanol® 23-3, or Dobanol® 23-2, or mixtures thereof. These Dobanol® surfactants are commercially available from SHELL. These Lutensol® surfactants are commercially available from BASF and these Tergitol® surfactants are commercially available from UNION CARBIDE.

In a preferred embodiment the nonionic surfactant herein is an alkoxylated nonionic surfactant according to the formula RO—$(A)_nH$, wherein : R is a $C_6$ to $C_{22}$, preferably a $C_8$ to $C_{22}$, more preferably a $C_9$ to $C_{14}$ alkyl chain, or a $C_6$ to $C_{28}$ alkyl benzene chain; A is an ethoxy or propoxy or butoxy unit; and wherein n is from 0 to 20, preferably from 1 to 15 and, more preferably from 2 to 15 even more preferably from 2 to 12 and most preferably from 4 to 10. Preferred R chains for use herein are the $C_8$ to $C_{22}$ alkyl chains. Even more preferred R chains for use herein are the $C_9$ to $C_{12}$ alkyl chains. Ethoxy/butoxylated, ethoxy/propoxylated, butoxy/propoxylated and ethoxy/butoxy/propoxylated nonionic surfactants may also be used herein. Preferred alkoxylated nonionic surfactants are ethoxylated nonionic surfactants.

Suitable alkylpolysaccharides for use herein are disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group. For acidic or alkaline cleaning compositions/solutions suitable for use in no-rinse methods, the preferred alkyl polysaccharide preferably comprises a broad distribution of chain lengths, as these provide the best combination of wetting, cleaning, and low residue upon drying. This "broad distribution" is defined by at least about 50% of the chainlength mixture comprising from about 10 carbon atoms to about 16 carbon atoms. Preferably, the alkyl group of the alkyl polysaccharide consists of a mixtures of chainlength, preferably from about 6 to about 18 carbon atoms, more preferably from about 8 to about 16 carbon atoms, and hydrophilic group containing from about one to about 1.5 saccharide, preferably glucoside, groups per molecule. This "broad chainlength distribution" is defined by at least about 50% of the chainlength mixture comprising from about 10 carbon atoms to about 16 carbon atoms. A broad mixture of chain lengths, particularly $C_8$–$C_{16}$, is highly desirable relative to narrower range chain length mixtures, and particularly versus lower (i.e., $C_8$–$C_{10}$ or $C_8$–$C_{12}$) chainlength alkyl polyglucoside mixtures. It is also found that the preferred $C_{8-16}$ alkyl polyglucoside provides much improved perfume solubility versus lower and narrower chainlength alkyl polyglucosides, as well as other preferred surfactants, including the $C_8$–$C_{14}$ alkyl ethoxylates. Any reducing saccharide containing 5 or 6 carbon atoms can be used, e.g., glucose, galactose and galactosyl moieties can be substituted for the glucosyl moieties. (optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units. The glycosyl is preferably derived from glucose.

Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched containing from 8 to 18, preferably from 10 to 16, carbon atoms. Preferably, the alkyl group is a straight-chain saturated alkyl group. The alkyl group can contain up to about 3 hydroxyl groups and/or the polyalkyleneoxide chain can contain up to about 10, preferably less than 5, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides and/ or galatoses. Suitable mixtures include coconut alkyl, di-, tri-, tetra-, and pentaglucosides and tallow alkyl tetra-, penta- and hexaglucosides.

To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-,3-, 4- and/or 6-position, preferably predominantly the 2-position.

In the alkyl polyglycosides, the alkyl moieties can be derived from the usual sources like fats, oils or chemically produced alcohols while their sugar moieties are created from hydrolyzed polysaccharides. Alkyl polyglycosides are the condensation product of fatty alcohol and sugars like glucose with the number of glucose units defining the relative hydrophilicity. As discussed above, the sugar units can additionally be alkoxylated either before or after reaction with the fatty alcohols. Such alkyl polyglycosides are described in detail in WO 86/05199 for example. Technical alkyl polyglycosides are generally not molecularly uniform products, but represent mixtures of alkyl groups and mixtures of monosaccharides and different oligosaccharides. Alkyl polyglycosides (also sometimes referred to as "APG's") are preferred for the purposes of the invention since they provide additional improvement in surface appearance relative to other surfactants. The glycoside moieties are preferably glucose moieties. The alkyl substituent is preferably a saturated or unsaturated alkyl moiety containing from about 8 to about 18 carbon atoms, preferably from about 8 to about 10 carbon atoms or a mixture of such alkyl moieties. $C_8$–$C_{16}$ alkyl polyglucosides are commercially available (e.g., Simusol® surfactants from Seppic Corporation, 75 Quai d'Orsay, 75321 Paris, Cedex 7, France, and Glucopon® 425 available from Henkel. However, it has been found that purity of the alkyl polyglucoside can also impact performance, particularly end result for certain applications, including daily shower product technology. In the present invention, the preferred alkyl polyglucosides are those which have been purified enough for use in personal cleansing. Most preferred are "cosmetic grade" alkyl polyglucosides, particularly $C_8$ to $C_{16}$ alkyl polyglucosides, such as Plantaren 200 ®, Plantaren 2000 N®, and Plantaren 2000 N UP®, available from Henkel Corporation (Postfach 101100, D 40191 Dusseldorf, Germany).

iii. Amphoteric/Zwitterionic Surfactants

Suitable amphoteric surfactants for use herein include amine oxides having the following formula $R_1R_2R_3NO$ wherein each of $R_1$, $R_2$ and $R_3$ is independently a saturated substituted or unsubstituted, linear or branched hydrocarbon chains of from 1 to 30 carbon atoms. Preferred amine oxide surfactants to be used according to the present invention are amine oxides having the following formula $R_1R_2R_3NO$ wherein $R_1$ is an hydrocarbon chain comprising from 1 to 30 carbon atoms, preferably from 6 to 20, more preferably from 8 to 16, most preferably from 8 to 12, and wherein $R_2$ and $R_3$ are independently substituted or unsubstituted, linear or branched hydrocarbon chains comprising from 1 to 4 carbon atoms, preferably from 1 to 3 carbon atoms, and more preferably are methyl groups. $R_1$ may be a saturated substituted or unsubstituted linear or branched hydrocarbon chain.

Suitable amine oxides for use herein are for instance natural blend $C_8$–$C_{10}$ amine oxides as well as $C_{12}$–$C_{16}$ amine oxides commercially available from Hoechst and Clariant.

Suitable zwitterionic surfactants for use herein contain both cationic and anionic hydrophilic groups on the same molecule at a relatively wide range of pH's. The typical cationic group is a quaternary ammonium group, although other positively charged groups like phosphonium, imidazolium and sulfonium groups can be used. The typical anionic hydrophilic groups are carboxylates and sulfonates, although other groups like sulfates, phosphonates, and the like can be used. A generic formula for some zwitterionic surfactants to be used herein is wherein $R_1$ is a hydrophobic group; $R_2$ and $R_3$ are each $C_1$–$C_4$ alkyl, hydroxy alkyl or other substituted alkyl group which can also be joined to form ring structures with the N; $R_4$ is a moiety joining the cationic nitrogen atom to the hydrophilic group and is typically an alkylene, hydroxy alkylene, or polyalkoxy group containing from 1 to 10 carbon atoms; and X is the hydrophilic group which is preferably a carboxylate or sulfonate group. Preferred hydrophobic groups $R_1$ are alkyl groups containing from 1 to 24, preferably less than 18, more preferably less than 16 carbon atoms. The hydrophobic group can contain unsaturation and/or substituents and/or linking groups such as aryl groups, amido groups, ester groups and the like. In general, the simple alkyl groups are preferred for cost and stability reasons.

Highly preferred zwitterionic surfactants include betaine and sulphobetaine surfactants, functionalized betaines such as acyl betaines, alkyl imidazoline alanine betaines, glycine betaines, derivatives thereof and mixtures thereof. Said betaine or sulphobetaine surfactants are preferred herein as they help disinfection by increasing the permeability of the bacterial cell wall, thus allowing other active ingredients to enter the cell.

Furthermore, due to the mild action profile of said betaine or sulphobetaine surfactants, they are particularly suitable for the cleaning of delicate surfaces, e.g., delicate laundry or surfaces in contact with food and/or babies. Betaine and sulphobetaine surfactants are also extremely mild to the skin and/or surfaces to be treated.

Suitable betaine and sulphobetaine surfactants for use herein are the betaine/sulphobetaine and betaine-like detergents wherein the molecule contains both basic and acidic groups which form an inner salt giving the molecule both cationic and anionic hydrophilic groups over a broad range of pH values. Some common examples of these detergents are described in U.S. Pat. Nos. 2,082,275, 2,702,279 and 2,255,082, incorporated herein by reference. Preferred betaine and sulphobetaine surfactants herein are according to the formula wherein R1 is a hydrocarbon chain containing from 1 to 24 carbon atoms, preferably from 8 to 18, more preferably from 12 to 14, wherein R2 and R3 are hydrocarbon chains containing from 1 to 3 carbon atoms, preferably 1 carbon atom, wherein n is an integer from 1 to 10, preferably from 1 to 6, more preferably is 1, Y is selected from the group consisting of carboxyl and sulfonyl radicals and wherein the sum of R1, R2 and R3 hydrocarbon chains is from 14 to 24 carbon atoms, or mixtures thereof.

Examples of particularly suitable betaine surfactants include $C_{12}$–$C_{18}$ alkyl dimethyl betaine such as coconutbetaine and $C_{10}$–$C_{16}$ alkyl dimethyl betaine such as laurylbetaine. Coconutbetaine is commercially available from Seppic under the trade name of Amonyl 265®. Laurylbetaine is commercially available from Albright & Wilson under the trade name Empigen BB/L®.

Other specific zwitterionic surfactants have the generic formulas:

or wherein each $R_1$ is a hydrocarbon, e.g. an alkyl group containing from 8 up to 20, preferably up to 18, more preferably up to 16 carbon atoms, each $R_2$ is either a hydrogen (when attached to the amido nitrogen), short chain alkyl or substituted alkyl containing from one to 4 carbon atoms, preferably groups selected from the group consisting of methyl, ethyl, propyl, hydroxy substituted ethyl or propyl and mixtures thereof, preferably methyl, each $R_3$ is selected from the group consisting of hydrogen and hydroxy groups and each n is a number from 1 to 4, preferably from 2 to 3, more preferably 3, with no more than one hydroxy group in any $(C(R_3)_2)$ moiety. The $R_1$ groups can be branched and/or unsaturated. The $R_2$ groups can also be connected to form ring structures. A surfactant of this type is a $C_{10}$–$C_{14}$ fatty acylamidopropylene(hydroxypropylene)sulfobetaine that is available from the Sherex Company under the trade name "Varion CAS sulfobetaine"®.

B. Solvent System

The compositions herein can comprise a solvent system comprising a solvent or mixtures thereof. The solvent system herein can be used instead of, or in combination with, the surfactant system described supra. When used, solvents will, advantageously, give an enhanced cleaning to the compositions herein. Suitable solvents for incorporation in the compositions according to the present invention include propylene glycol derivatives such as n-butoxypropanol or n-butoxypropoxypropanol, water-soluble CARBITOL® solvents or water-soluble CELLOSOLVE ® solvents. Water-soluble CARBITOL® solvents are compounds of the 2-(2-alkoxyethoxy)ethanol class wherein the alkoxy group is derived from ethyl, propyl or butyl. A preferred water-soluble carbitol is 2-(2-butoxyethoxy)ethanol also known as butyl carbitol. Water-soluble CELLOSOLVE® solvents are compounds of the 2-alkoxyethoxyethanol class, with 2-butoxyethoxyethanol being preferred. Other suitable solvents are benzyl alcohol, methanol, ethanol, isopropyl alcohol and diols such as 2-ethyl-1,3-hexanediol and 2,2,4-trimethyl-1,3-pentanediol and mixture thereof. Preferred solvents for use herein are n-butoxypropoxypropanol, butyl carbitol®, benzyl alcohol, isopropanol, 1-propanol and mixtures thereof. Most preferred solvents for use herein are butyl carbitol®, benzyl alcohol, 1-propanol and/or isopropanol.

The solvent system, when present, is typically present in the compositions according to the invention at a level up to 100% by weight, preferably from 0.5% to 90%, more preferably from 1% to 10% by weight of the composition.

C. Optional Ingredients

The compositions herein may further comprise a variety of other optional ingredients such as peroxygen bleach, essential oils, organic acids, additional surfactants, chelants, solvents, builders, stabilisers, bleach activators, soil suspenders, dye transfer agents, brighteners, perfumes, anti dusting agents, enzymes, dispersant, dye transfer inhibitors, pigments, perfumes, radical scavengers, pH buffers, dyes or mixtures thereof.

i. Peroxygen Bleach

The compositions according to the present invention may comprise a peroxygen bleach as an optional feature.

A preferred peroxygen bleach is hydrogen peroxide, or a water soluble source thereof, or mixtures thereof. As used herein a hydrogen peroxide source refers to any compound which produces hydrogen peroxide when said compound is in contact with water. Suitable water-soluble sources of hydrogen peroxide for use herein include percarbonates, persilicates, persulphates such as monopersulfate, perborates and peroxyacids such as diperoxydodecandioic acid (DPDA), magnesium perphthalic acid and mixtures thereof.

In addition, other classes of peroxides can be used as an alternative to hydrogen peroxide and sources thereof or in combination with hydrogen peroxide and sources thereof. Suitable classes include dialkylperoxides, diacylperoxides, preformed percarboxylic acids, organic and inorganic peroxides and/or hydroperoxides. The most preferred peroxygen bleach is hydrogen peroxide.

The presence of said peroxygen bleach especially hydrogen peroxide, persulfate and the like, in the compositions according to the present invention can contribute to disinfection properties of said compositions. Indeed, said peroxygen bleach may attack the vital function of the microorganism cells, for example, it may inhibit the assembling of ribosomes units within the cytoplasm of the microorganisms cells. Also said peroxygen bleach like hydrogen peroxide, is an oxidiser that generates hydroxyl free radicals which attack proteins and nucleic acids. Furthermore, the presence of said peroxygen bleach, especially hydrogen peroxide, provides strong stain removal benefits which are particularly noticeable for example in laundry and hard surfaces applications.

Typically, peroxygen bleach or a mixture thereof is present in the compositions according to the present invention at a level of at least 0.01% by weight of the total composition, preferably from 0.1% to 15%, and more preferably from 1% to 10%.

ii. Essential Oils

Another preferred component of the compositions of the present invention is an antimicrobial essential oil or an active thereof, or a mixture thereof.

Suitable antimicrobial essential oils to be used herein are those essential oils which exhibit antimicrobial activity. By "actives of essential oils", it is meant herein any ingredient of essential oils or natural extracts that exhibit antimicrobial activity. It is speculated that said antimicrobial essential oils and actives thereof act as proteins denaturing agents. Also said antimicrobial oils and actives thereof are compounds which contribute to the safety profile of a composition comprising them when it is used to disinfect any surface. A further advantage of said antimicrobial oils and actives thereof is that they impart pleasant odor to a composition comprising them without the need of adding a perfume.

Such antimicrobial essential oils include, but are not limited to, those obtained from thyme, lemongrass, citrus, lemons, oranges, anise, clove, aniseed, pine, cinnamon, geranium, roses, mint, lavender, citronella, eucalyptus, peppermint, camphor, ajowan, sandalwood, rosmarin, vervain, fleagrass, lemongrass, ratanhiae, cedar, origanum, cypressus, propolis extracts and mixtures thereof. Preferred antimicrobial essential oils to be used herein are thyme oil, clove oil, cinnamon oil, geranium oil, eucalyptus oil, peppermint oil, citronella oil, ajowan oil, mint oil, origanum oil, propolis, cypressus oil cedar, garlic extract or mixtures thereof.

Actives of essential oils to be used herein include, but are not limited to, thymol (present for example in thyme, ajowan), eugenol (present for example in cinnamon and clove), menthol (present for example in mint), geraniol (present for example in geranium and rose, citronella), verbenone (present for example in vervain), eucalyptol and pinocarvone (present in eucalyptus), cedrol (present for example in cedar), anethol (present for example in anise), carvacrol, hinokitiol, berberine, ferulic acid, cinnamic acid, methyl salicylic acid, methyl salicylate, terpineol, limonene and mixtures thereof. Preferred actives of essential oils to be used herein are thymol, eugenol, verbenone, eucalyptol, terpineol, cinnamic acid, methyl salicylic acid, limonene, geraniol, ajolene or mixtures thereof.

Thymol may be commercially available for example from Aldrich, eugenol may be commercially available for example from Sigma, Systems—Bioindustries (SBI)—Manheimer Inc.

Typically, the antimicrobial essential oil or active thereof or mixture thereof is present in the composition at a level of at least 0.001% by weight of the total composition, preferably from 0.006% to 10%, more preferably from 0.01% to 8% and most preferably of from 0.03% to 3%.

It has now been found that combining said antimicrobial essential oil or an active thereof or a mixture thereof with a peroxygen bleach, in a composition, delivers not only excellent immediate disinfecting properties to the surfaces treated with said composition, but also long lasting disinfecting properties. Indeed, it is speculated that peroxygen bleach and said essential oils/actives adsorb on a surface having been treated with said composition and thus reduce or even prevent the contamination of microorganisms over time, typically up to 48 hours after the surface has been treated with said composition, thereby delivering long lasting disinfection. In other words, it is speculated that a microfilm of said active ingredients is deposited on the surface treated with said compositions allowing protection against microorganisms recontamination overtime. Advantageously, this long lasting disinfection benefits is obtained with the compositions of the present invention comprising peroxygen bleach and antimicrobial essential oils/actives even when used under highly diluted conditions, i.e., up to dilution levels of from 1:100 (composition:water).

Excellent long lasting disinfection is obtained by treating a surface with a composition comprising a peroxygen bleach and an antimicrobial essential oil or active thereof as described herein, on a variety of microorganisms, e.g., the growth of Gram positive bacteria like *Staphylococcus aureus*, and Gram negative bacteria like *Pseudomonas aeroginosa* as well as of fungi like *Candida albicans* is reduced or even prevented on a surface having been treated with said composition.

Long lasting disinfection properties of the compositions herein may be measured by the bactericidal activity of said compositions. A test method suitable to evaluate the long lasting bactericidal activity of a composition may be as follow: First, the surfaces (e.g. glass) to be tested are respectively treated with either a composition according to the present invention or a reference composition, e.g., a negative control composed of pure water (for example by spraying the composition directly on the surface or first spraying the composition on a sponge used to clean the surface or when the composition herein is executed in the form of wipe by wiping the surface therewith). After a variable time frame (e.g. 24 hours) each surface is respectively inoculated with bacteria ($10^{6-7}$cfu/slide) cultured in for example TSB (Tryptone Soya Broth) and left typically from a few seconds to 2 hours before evaluating the remaining living bacteria. Then living bacteria (if any) are recovered from the surface (by touching TSA+neutraliser plates and by re-suspending the bacteria into the neutralisation broth and plating them on agar) and incubated at appropriate temperature, e.g. 37° C. to let them grow typically over night. Finally, a visual grading of the living bacteria is made by comparing side by side the cultures and/or dilutions thereof (e.g. $10^{-2}$ or $10^{-1}$) resulting from the surfaces treated with the compositions according to the present invention and the reference composition.

In a particular embodiment of the present invention, depending on the end use desired with said compositions they may further comprise, as optional ingredients, other antimicrobial compounds that further contribute to the antimicrobial/antibacterial activity of the compositions according to the present invention. Such antimicrobial ingredients include parabens like ethyl paraben, propyl paraben, methyl paraben, glutaraldehyde or mixtures thereof.

iii. Additional Surfactant

The compositions of the present invention may comprise an additional surfactant. The additional surfactant may be selected from other nonionic, amphoteris, zwitterionic or anionic surfactants including but not limited to those described above. Alternatively the additional surfactant may include for example a cationic surfactant or a $C_6$–$C_{20}$ conventional soaps (alkali metal salt of a $C_6$–$C_{20}$ fatty acid, preferably sodium salts).

iv. Chealating Agent

The compositions herein may further comprise a chelating agent as a preferred optional ingredient. Suitable chelating agents may be any of those known to those skilled in the art such as the ones selected from the group comprising phosphonate chelating agents, aminophosphonate chelating agents, substituted heteroaromatic chelating agents, amino carboxylate chelating agents, other carboxylate chelating agents, polyfunctionally-substituted aromatic chelating agents, biodegradable chelating agents like ethylene diamine N,N'-disuccinic acid, or mixtures thereof.

Suitable phosphonate chelating agents to be used herein include etidronic acid (1-hydroxyethylene-diphosphonic acid (HEDP)), and/or alkali metal ethane 1-hydroxydiphosphonates.

Suitable amino phosphonate chelating agents to be used herein include amino alkylene poly (alkylene phosphonates), nitrilotris(methylene)triphosphonates, ethylene diamine tetra methylene phosphonates, and/or diethylene triamine penta methylene phosphonates. Preferred aminophosphonate chelating agents to be used herein are diethylene triamine penta methylene phosphonates.

These phosphonate/amino phosphonate chelating agents may be present either in their acid form or as salts of different cations on some or all of their acid functionalities. Such phosphonate/amino phosphonate chelating agents are commercially available from Monsanto under the trade name DEQUEST®.

Substituted heteroaromatic chelating agents to be used herein include hydroxypiridine-N-oxide or a derivative thereof.

Suitable hydroxy pyridine N-oxides and derivatives thereof to be used according to the present invention are according to the following formula:

wherein X is nitrogen, Y is one of the following groups oxygen, —CHO, —OH, —(CH2)n—COOH, wherein n is an integer of from 0 to 20, preferably of from 0 to 10 and more preferably is 0, and wherein Y is preferably oxygen. Accordingly particularly preferred hydroxy pyridine N-oxides and derivatives thereof to be used herein is 2-hydroxy pyridine N-oxide. Hydroxy pyridine N-oxides and derivatives thereof may be commercially available from Sigma.

Polyfunctionally-substituted aromatic chelating agents may also be useful in the compositions herein. See U.S. Pat. No. 3,812,044, issued May 21, 1974, to Connor et al. Preferred compounds of this type in acid form are dihydroxydisulfobenzenes such as 1,2-dihydroxy -3,5-disulfobenzene.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987 to Hartman and Perkins. Ethylenediamine N,N'-disuccinic acid is, for instance, commercially available under the tradename ssEDDS® from Palmer Research Laboratories. Ethylene diamine N,N'-disuccinic acid is particularly suitable to be used in the compositions of the present invention.

Suitable amino carboxylate chelating agents useful herein include ethylene diamine tetra acetates, diethylene triamine pentaacetates, diethylene triamine pentoacetate (DTPA), N-hydroxyethylethylenediamine triacetates, nitrilotri-acetates, ethylenediamine tetraproprionates, triethylenetetraaminehexa-acetates, ethanoldiglycines, propylene diamine tetracetic acid (PDTA) and methyl glycine di-acetic acid (MGDA), both in their acid form, or in their alkali metal, ammonium, and substituted ammonium salt forms. Particularly suitable to be used herein are diethylene triamine penta acetic acid (DTPA), propylene diamine tetracetic acid (PDTA) which is, for instance, commercially available from BASF under the trade name Trilon FS® and methyl glycine di-acetic acid (MGDA).

Further carboxylate chelating agents to be used herein includes malonic acid, salicylic acid, glycine, aspartic acid, glutamic acid, or mixtures thereof.

Typically, the compositions according to the present invention comprise up to 5% by weight of the total composition of a chelating agent, or mixtures thereof, preferably from 0.01% to 3% by weight and more preferably from 0.01% to 1.5%.

iv. Radical Scavenger

The compositions herein may comprise a radical scavenger as another optional ingredient. Suitable radical scavengers for use herein include the well-known substituted mono and di hydroxy benzenes and derivatives thereof, alkyl- and aryl carboxylates and mixtures thereof. Preferred radical scavengers for use herein include di-tert-butyl hydroxy toluene (BHT), p-hydroxy-toluene, hydroquinone (HQ), di-tert-butyl hydroquinone (DTBHQ), mono-tert-butyl hydroquinone (MTBHQ), tert-butyl-hydroxy anysole (BHA), p-hydroxy-anysol, benzoic acid, 2,5-dihydroxy benzoic acid, 2,5-dihydroxyterephtalic acid, toluic acid, catechol, t-butyl catechol, 4-allyl-catechol, 4-acetyl catechol, 2-methoxy-phenol, 2-ethoxy-phenol, 2-methoxy-4-(2-propenyl) phenol, 3,4-dihydroxy benzaldehyde, 2,3-dihydroxy benzaldehyde, benzylamine, 1,1,3-tris(2-methyl-4-hydroxy-5-t-butylphenyl) butane, tert-butyl-hydroxy-anyline, p-hydroxy anyline as well as n-propyl-gallate. Highly preferred for use herein are di-tert-butyl hydroxy toluene, which is for example commercially available from SHELL under the trade name IONOL CP® and/or tert-butyl-hydroxy anysole. These radical scavengers further contribute to the stability of the peroxygen bleach-containing compositions herein.

Typically, the compositions according to the present invention comprise up to 5% by weight of the total composition of a radical scavenger, or mixtures thereof, preferably from 0.002% to 1.5% by weight and more preferably from 0.002% to 1%.

V. pH Buffer

In the embodiment of the present invention wherein the compositions are formulated in the alkaline pH range, typically from 7.5 to 12, the compositions according to the present invention may further comprise a pH buffer or a mixture thereof, i.e. a system composed of a compound or a combination of compounds, whose pH changes only slightly when a strong acid or base is added.

Suitable pH buffers for use herein include borate pH buffer, phosphonate, silicate and mixtures thereof. Suitable borate pH buffers for use herein include alkali metal salts of borates and alkyl borates and mixtures thereof. Suitable borate pH buffers to be used herein are alkali metal salts of borate, metaborate, tetraborate, octoborate, pentaborate, dodecaboron, borontrifluoride and/or alkyl borate containing from 1 to 12 carbon atoms, and preferably from 1 to 4. Suitable alkyl borate includes methyl borate, ethyl borate and propyl borate. Particularly preferred herein are the alkali metal salts of metaborate (e.g. sodium metaborate), tetraborate (e.g., sodium tetraborate decahydrate) or mixtures thereof.

Boron salts like sodium metaborate and sodium tetraborate are commercially available from Borax and Societa Chimica Larderello under the trade name sodium metaborate® and Borax®.

Further suitable pH buffers for use herein include carbonates and bicarbonates including alkali metal salts of carbonates and bicarbonates.

The pH of the composition can also be adjusted to an acidic pH and/or buffered at that pH using any suitable acidifying agent, for example organic acids.

Typically, the compositions according to the present invention may comprise up to 15% by weight of the total composition of a pH buffer, or mixtures thereof, preferably from 0.01% to 10%, more preferably from 0.01% to 5% and most preferably from 0.1% to 3%.

III. Packaging for the Premoistened Wipes

In a preferred embodiment according to the present invention, the premoistened wipes are packaged in the container in any convenient configuration which allows easy removal of a single or multiple wet wipe from the container. Preferably the wipes are packaged in rolls, stacks or piles. More preferably the wipes are provided in a stacked configuration which may comprise any number of wipes. Typically, the stack comprises from 2 to 150, more preferably from 5 to 100, most preferably from 10 to 60 wipes. Moreover the wipes may be provided folded or unfolded. Most preferably, the wipes are stacked in a folded configuration.

IV. Method of Treating a Surface Using the Premoistened Wipes

In a preferred embodiment, the present invention encompasses a method of cleaning and/or disinfecting a surface, preferably a hard surface, comprising the step of contacting, preferably wiping, said surface with a premoistened wipe comprising a substrate which incorporates a composition as described herein.

In a preferred embodiment of the present invention, said method comprises the steps of contacting parts of said surface, more preferably soiled parts of said surface, with said premoistened wipe comprising a substrate which incorporates a composition as described herein.

In another preferred embodiment said method, after contacting said surface with said premoistened wipe comprising a substrate which incorporates a composition as described herein, further comprises the step of imparting mechanical action to said surface using said substrate which incorporates a composition as described herein. By "butoxypropoxypropanol, mechanical action" it is meant herein, agitation of the wet wipe on the surface, as for example rubbing the surface using the wet wipe.

By "surface", it is meant herein any surface including animate surface like human skin, mouth, teeth, and inanimate surfaces. Inanimate surfaces include, but are not limited to, hard-surfaces typically found in houses like kitchens, bathrooms, or in car interiors, e.g., tiles, walls, floors, chrome, glass, smooth vinyl, any plastic, plastified wood, table top, sinks, cooker tops, dishes, sanitary fittings such as sinks, showers, shower curtains, wash basins, WCs and the like, as well as fabrics including clothes, curtains, drapes, bed linens, bath linens, table cloths, sleeping bags, tents, upholstered furniture and the like, and carpets. Inanimate surfaces also include household appliances including, but not limited to, refrigerators, freezers, washing machines, automatic dryers, ovens, microwave ovens, dishwashers and the like.

V. Desorption Under Pressure Test Method

The amount of fluid released ("desorbed") by a premoistened wipe comprising a substrate and a cleaning composition when subjected to pressure (or a force) is measured according to the Desorption Under Pressure Test Method. The test method is carried out as follows.

Figure 2:
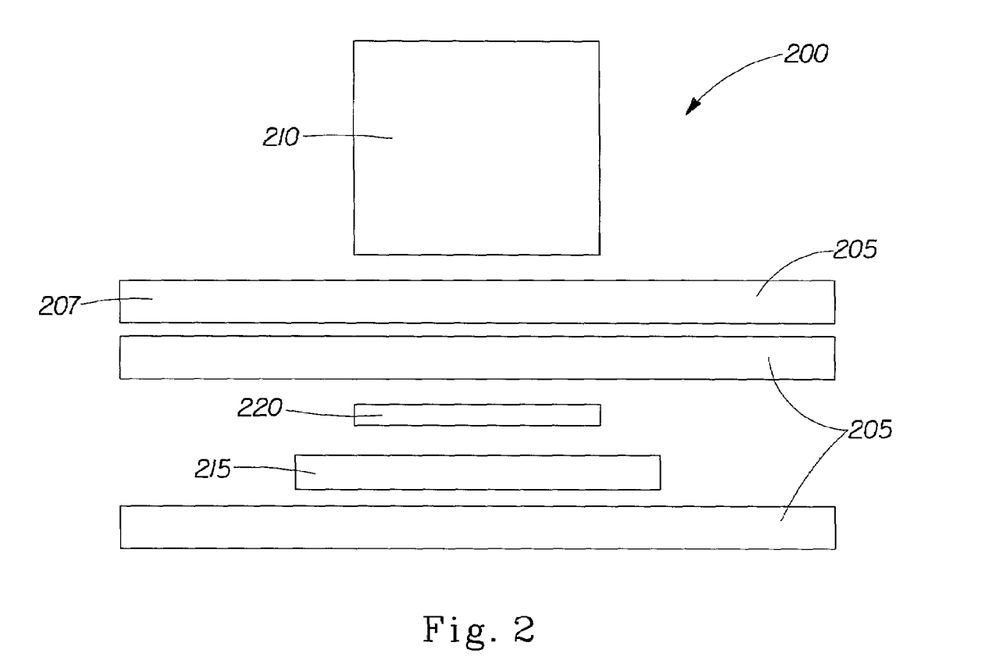
FIG. 2 is a block diagram of the apparatus used in the Desorption Under Pressure Test Method described in Section V, infra.

The Desorption Under Pressure Test Method utilizes an apparatus as shown in the block diagram of FIG. 2. The apparatus 200 contains the following components: three Plexiglass sheets 205 (127 mm×127 mm×6.4 mm); metal disk weights 210 (76.2 mm diameter) weighing about 227 grams, about 455 grams, and about 906 grams; a standard reference absorbent core material 215 (the standard reference absorbent core material 215 is a single 102 mm×102 mm piece of Ahlstrom No. 989 filter paper available from Ahlstrom Filtration, P.O. Box A, Mr. Holly Springs, Pa.), and a pre-moistened wipe test sample 220 (76.2 mm diameter). One of the Plexiglass sheets 207 is used as a weight (about 115 grams) for determining the amount of fluid desorbed from the test sample 220 of interest. A combination of metal disk weight(s) 210 and Plexiglass sheet(s) 207 is used to obtain the desired applied pressure load.

In the Desorption Under Pressure Test Method, the substrate of the test sample 220 is premoistened to a specific level (i.e., X-Load which is grams of fluid per gram of dry fiber in wipe) with a liquid composition according to Composition H, infra. The premoistened wipe test sample 220 is placed and centered on top of the standard reference absorbent core material 215. A Plexiglass sheet 207 with the appropriate amount of metal disk weights 210 are placed (centered) on top of the premoistened wipe test sample 220. After about 30 seconds, the top Plexiglass sheet 207 and the associated metal disk weights 210 are removed. The premoistened wipe test sample 220 is weighed to determine the amount of fluid released ("desorbed"). The amount of desorption (or lotion loss) is expressed in X-Load (i.e., grams of fluid loss per gram of dry fiber in wipe).

Test results are presented in a graph created by plotting lotion loss ("X-Load") vs. Pressure (psi). The graphs presented herein cover initial lotion X-Load factors of 2.2× and 3.2× (i.e., the premoistened wipe test sample contains liquid composition at 2.2 and 3.2 times the dry fiber weight of the wipe). The applied pressure loads tested range from about 0.03 to about 0.46 psi.

All of the documents and references referred to herein are incorporated by reference, unless otherwise specified. All parts, ratios, and percentages herein, in the Specification, Examples, and Claims, are by weight and all numerical limits are used with the normal degree of accuracy afforded by the art, unless otherwise specified.

VI. Examples

The following are non-limiting examples of compositions that can be incorporated in the substrates of the present invention to form the premoistened wipes of the present invention. Such compositions are typically loaded onto a substrate of the present invention at a level of from about 50% to about 600%, preferably from about 100% to about 400%, by weight of the dry substrate.

|  | Composition | | | | | |
| --- | --- | --- | --- | --- | --- | --- |
| Ingredients | A | B | C | D | E | F |
| Thymol | 0.025 | — | — | — | — | — |
| Geraniol | 0.0375 | — | 0.3 | — | — | — |
| Perfume | 0.0375 | 0.1 | 0.1 | 0.1 | 0.1 | 0.15 |
| Ethanol | 9.4 | 9.4 | 5 | 9.4 | 8 | 8 |
| Propylene glycol butyl ether (nBP) | — | — | — | — | — | 1.2 |
| Silicone DowAF | — | 0.003 | — | 0.003 | 0.003 | 0.003 |
| $C_{12-14}$ amine oxide | — | 0.2 | 0.2 | — | 0.1 | — |
| $C_{10}$ amine oxide | — | — | — | 0.2 | — | 0.02 |
| $C_{9-10}$ EO10 | 1.0 | 0.2 | — | 0.8 | 0.1 | — |
| $C_{9-11}$ EO5 | — | — | — | — | — | 0.1 |
| $C_{12-14}$ Betaine sodium salt | 0.25 | — | — | — | — | — |
| 2-Ethyl-Hexyl Sulphate | 0.75 | 0.1 | 0.1 | 0.15 | 0.05 | 0.05 |
| Citric acid | 1.5 | 0.75 | 1.5 | 1.0 | — | — |
| Lactic acid | — | — | — | — | 0.44 | — |
| Na2CO3 | — | 0.1 | — | — | 0.06 | — |
| NaOH | — | 0.45 | — | — | 0.2 | — |
| Water | Bal. | Bal. | Bal. | Bal. | Bal. | Bal. |
| PH | 2.4 | 9.5 | 2.8 | 2.8 | 9.5 | 7.1 |

|  | Composition | | | | | |
| --- | --- | --- | --- | --- | --- | --- |
| Ingredient | G | H | I | J | K | L |
| Organic Acid #1[1] | 1.5 | 1.8 | 2.75 | 1.25 | 1.5 | 0.75 |
| Surfactant #1[2] | 1.75 | 1.75 | 1.0 | 1.0 | 1.0 | 2.0 |
| Solvent #1[3] | 0.5 | 0.5 | — | — | 0.5 | 0.5 |
| Hydrotrope[4] | 1.2 | 1.2 | — | 0.45 | 1.20 | 1.2 |
| Suds Suppressor[5] | — | 0.0037 | — | 0.0030 | — | — |
| Perfume | 0.2 | 0.2 | — | 0.20 | 0.20 | 0.2 |
| Water | Balance | Balance | Balance | Balance | Balance | Balance |

[1]Citric acid commercially available from Cargill.
[2]Nonionic alcohol ethoxylate surfactant commercially available from Vista Chemical Company under the tradename ALFONIC ® 810-6 Ethoxylated.
[3]Butoxy propoxy propanol commercially available from Dow Chemical.
[4]Sodium cumene sulfonate commercially available from Reutgers-Nease Chemical Company under the tradename NAXONATE ® 45SC.
[5]Silicone suds suppressor commercially available from Dow Corning under the tradename DOW AF.

| Ingredient | Composition | | | |
| --- | --- | --- | --- | --- |
| | M | N | O | P |
| Organic Acid #1[6] | 1.5 | 1.5 | — | — |
| Organic Acid #2[7] | — | — | 4.0 | — |
| Organic Acid #3[8] | — | — | — | 3.0 |
| Surfactant #1[9] | — | — | 1.0 | 1.5 |
| Surfactant #2[10] | 0.4 | 1.0 | — | — |
| Solvent #2[11] | 9.4 | 9.4 | — | — |
| Solvent #3[12] | 0.55 | 0.55 | — | — |
| Solvent #4[13] | 0.55 | 0.55 | — | — |
| Perfume | 0.075 | 0.75 | — | — |
| Water | Balance | Balance | Balance | Balance |

[6]Citric acid commercially available from Cargill.
[7]Acetic acid commerically available from Aldrich.
[8]Lactic acid commercially available from Aldrich.
[9]Nonionic alcohol ethoxylate surfactant commercially available from Vista Chemical Compnay under the tradename ALFONIC ® 810-6 Ethoxylated.
[10]Amine oxide ($C_{12}$) surfactant commercially available from the Stepan Company under the trade name NINOX ® x9336.
[11]Ethanol commercially available from Aldrich.
[12]Propylene glycol T-butyl ether commercially available from Aldrich.
[13]De(ethylene glycol) butyl ether commercially available from Aldrich.

The following examples, Substrate A and Substrate B, are non-limiting examples of substrates according to the present invention. The controlled fluid release performance of Substrate A and Substrate B are tested against Comparative Substrate C and Comparative Substrate D according to the Desorption Under Pressure Test Method described in Section V, supra. The results show that Substrate A and Substrate B have much better controlled fluid release performance than Comparative Substrate C. The results further show that Substrate A and Substrate B have controlled fluid release performance similar to that of Comparative Substrate D, which is an airlaid substrate containing a binder material.

Substrate A

Substrate A is a multi-layer substrate as shown in FIGS. 1a and 1b and described in Section I, supra.

Substrate B

Substrate B is a 70 gsm carded thermal bonded nonwoven substrate consisting of three carded fiber layers (two surface contact layers and one reservoir layer) thermal bonded together with a 7-point pattern. The overall fiber composition is about 58% hydrophilic polypropylene (2.2 dpf, 38 mm length, FiberVisions Americas Type 193), about 25% viscose rayon (1.5 dpf, 40 mm length, Acordis Cellulosic Fibers, Inc. T-1099), and about 18% PET (6.0 dpf, 50 mm, Wellman, Inc. Type 204). The two surface contact layers are made of a homogenous blend of about 60% hydrophilic polypropylene (2.2 dpf, 38 mm length, FiberVisions Americas Type 193), about 10% viscose rayon (1.5 dpf, 40 mm length, Acordis Cellulosic Fibers, Inc. T-1099), and about 30% PET (6.0 dpf, 50 mm, Wellman, Inc. Type 204) with a basis weight of about 20.5 gsm per layer. The reservoir layer is made of a homogenous blend of about 55% hydrophilic polypropylene (2.2 dpf, 38 mm length, FiberVisions Americas Type 193) and about 45% viscose rayon (1.5 dpf, 40 mm length, Acordis Cellulosic Fibers, Inc. T-1099 with a basis weight of about 29.0 gsm.

Substrate B is made according to the following process. The reservoir layer is made by blending (by weight) about 55% hydrophilic polypropylene (2.2 dpf, 38 mm length, FiberVisions Americas Type 193) and about 45% viscose rayon (1.5 dpf, 40 mm length, Acordis Cellulosic Fibers, Inc. T-1099). These blends are fed into two cards (about 14.5 gsm per card) to form a reservoir layer with an overall basis weight of about 29.0 gsm. After carding, the reservoir layer was embossed with a continuous 7-point pattern at about 300° F. and about 540 psi and wound for later use in forming the multi-layer substrate.

The two surface contact layers of Substrate B are made by blending (by weight) of about 60% hydrophilic polypropylene (2.2 dpf, 38 mm length, FiberVisions Americas Type 193), about 10% viscose rayon (1.5 dpf, 40 mm length, Acordis Cellulosic Fibers, Inc. T-1099), and about 30% PET (6.0 dpf, 50 mm, Wellman, Inc. Type 204). These blends are fed into two cards (top and bottom, about 20.5 gsm per card). In forming the multi-layer substrate (Substrate B): (1) the bottom carded fiber surface contact layer is placed on a moving conveyor, (2) the pre-made center reservoir layer is unwound on top of the bottom carded fiber surface contact layer, and (3) the top carded fiber surface contact layer is placed on top of the pre-formed center reservoir layer and the bottom carded fiber layer. These three fibrous web layers are thermally embossed together with a continuous 7-point pattern at about 300° F. and about 540 psi. The resultant Substrate B has an average basis weight of about 70 gsm.

Comparative Substrate C

Comparative Substrate C is a 70 gsm carded thermal bonded nonwoven substrate made of a homogenous blend of about 50% hydrophilic polypropylene (2.2 dpf, 38 mm length, FiberVisions Americas Type 193), about 20% viscose rayon (1.5 dpf, 40 mm length, Acordis Cellulosic Fibers, Inc. T-1099), and about 30% PET (6.0 dpf, 50 mm, Wellman, Inc. Type 204) with a continuous 7-point pattern embossed pattern.

Comparative Substrate C is made according to the following process. Hydrophilic polypropylene, viscose rayon, and polyester fibers are blended together at about 50%, about 20%, and about 30% by weight and then carded. Three cards (individual card basis weight of about 23.3 gsm) are used to form a homogenous composite web (at 25 meters/min) with a total basis weight of about 70 gsm. After carding, the homogenous composite web is thermally embossed (about 300° F. and about 540 psi) with a continuous 7-point pattern embossed pattern. The resultant web has a basis weight of about 70 gsm.

Comparative Substrate D

Comparative Substrate D is a 73 gsm air laid substrate made of a homogenous blend of about 73% wood pulp (Weyherhaeuser NF405), about 15% polyester (DuPont 612W), and about 12% Cymel Binder. The web has an average caliper of 1.12 mm and average density of about 0.065g/cm$^3$.

Desorption Under Pressure Test #1

Figure 3:
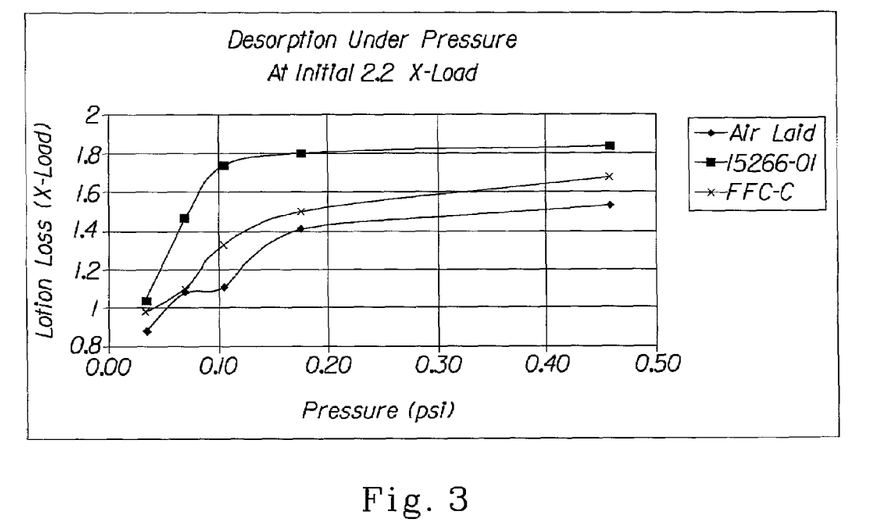
FIG. 3 is a graph of a Desorption Under Pressure curve (Lotion Loss vs. Pressure) at an Initial 2.2×-Load.

Substrate B and Comparative Substrates C and D are tested according to the Desorption Under Pressure Test Method. The substrates are prepared by loading Composition H (see supra) onto each substrate at a loading factor of 2.2×. FIG. 3 is a graph of the results of the Desorption Under Pressure test for Substrate B (denoted "FFC-C"), Comparative Substrate C (denoted "15266-01"), and Comparative Substrate D (denoted "Air Laid"). As can be seen in the graph of FIG. 3, Substrate B (which is a multi-layer substrate of the present invention) exhibited much more controlled release of the liquid composition than Comparative Substrate C (which is a homogeneous web, instead of a multi-layer web). Also, as can be seen in the graph of FIG. 3, Comparative Substrate D, which is a homogeneous fiber blend airlaid material, also exhibited excellent controlled fluid release properties, however, such substrate contains a binder material that can negatively impact filming and streaking, especially of hard surfaces.

Desorption Under Pressure Test #2

Figure 4:
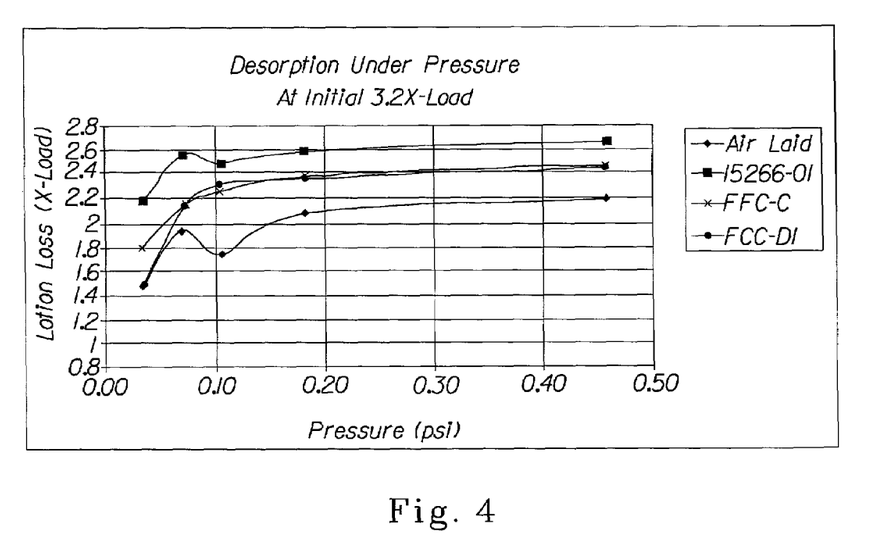
FIG. 4 is a graph of a Desorption Under Pressure curve (Lotion Loss vs. Pressure) at an Initial 3.2×-Load.

Substrates A and B, and Comparative Substrates C and D, are tested according to the Desorption Under Pressure Test Method. The substrates are prepared by loading Composition H (see supra) onto each substrate at a loading factor of 3.2×. FIG. 4 is a graph of the results of the Desorption Under Pressure test for Substrate A (denoted "FFC-D 1"), Substrate B (denoted "FFC-C"), Comparative Substrate C (denoted "15266-01"), and Comparative Substrate D (denoted "Air Laid"). As can be seen in the graph of FIG. 4, Substrates A and B (which are multi-layer substrates of the present invention) exhibited much more controlled release of the liquid composition than Comparative Substrate C (which is a homogeneous web, instead of a multi-layer web). Also, as can be seen in the graph of FIG. 4, Comparative Substrate D, which is a homogeneous fiber blend airlaid material, also exhibited excellent controlled fluid release properties, however, such substrate contains a binder material that can negatively impact filming and streaking, especially of hard surfaces.

What is claimed is:

1. A multi-layer substrate having a surface area, said substrate being suitable for incorporation in a premoistened wipe for cleaning surfaces, said substrate comprising:
   (a) at least one reservoir layer, wherein a first reservoir layer has a basis weight of at least about 15 gsm and comprises:
      (i) from at least about 5% to less than about 50%, by weight of said first reservoir layer, of carded hydrophilic polypropylene fibers and mixtures thereof with other carded hydrophilic fibers; and
      (ii) from at least about 50% to less than about 95% by weight of said first reservoir layer, of carded hydrophobic fibers;
      wherein the total basis weight of said reservoir layer(s) is from about 10% to about 95% of the total basis weight of said multi-layer substrate; and
   (b) at least one surface contacting layer; wherein a first surface contacting layer has a basis weight of at least about 5 gsm and comprises:
      (i) from at least about 20% to less than about 50%, by weight of said first surface contacting layer, of carded hydrophilic polypropylene fibers and mixtures thereof with other carded hydrophilic fibers; and
      (ii) from at least about 50% to less than about 80%, by weight of said first surface contacting layer, of carded hydrophobic fibers;
      wherein the total basis weight of said surface contacting layer(s) is from at least about 10% to less than about 60% of the total basis weight of said multi-layer substrate, and wherein said layers (a) and (b) are bonded to one another via patterned thermal bonding having about 1–40 bonds/cm² covering from about 5% to about 30% of the substrate's surface area.

2. The multi-layer substrate of claim 1, wherein said layers comprise a mixture of said hydrophilic polypropylene and a member selected from the group consisting of cellulosic fibers, modified cellulosic fibers, cotton, reconstituted or regenerated cellulosic fibers, hydrophilic nylon fibers, polylactic acid fibers, chemically stiffened cellulosic fibers, capillary channel fibers, polyethylene, hydrophobic polypropylene, polyethylene terephthalate, nylon, bicomponent fibers, and mixtures thereof and said layers are essentially free of a binder material.

3. The multi-layer substrate of claim 1, wherein said reservoir layer comprises a mixture of said hydrophilic polypropylene fibers and reconstituted or regenerated cellulosic fibers; and wherein said surface contacting layer comprises a mixture of said hydrophilic polypropylene fibers and polyethylene terephthbalate fibers.

4. The multi-layer substrate of claim 1, wherein said multi-layer substrate consists of two layers and is essentially free of water swellable polymers.

5. A premoistened wipe for cleaning a surface, said premoistened wipe comprising:
   (a) a multi-layer substrate according to claim 1; and
   (b) a liquid composition impregnated onto said substrate, said liquid composition comprising a surfactant system and/or a solvent system; wherein said surfactant system comprises a surfactant selected from the group consisting of anionic surfactants, nonionic surfactants, amphoteric surfactants, zwitterionic surfactants, and mixtures thereof.

6. The premoistened wipe of claim 5, wherein said liquid composition is loaded onto said substrate at a level of from about 50% to about 600%, by weight of said substrate.

7. The premoistened wipe of claim 6, wherein said liquid composition is loaded onto said substrate at a level of from about 100% to about 400%, by weight of said substrate.

8. The premoistened wipe of claim 7, wherein said liquid compositions is loaded onto said substrate at a level of from about 200% to about 350%, by weight of said substrate.

9. The premoistened wipe of claim 5, wherein said surfactant is a nonionic surfactant.

10. The premoistened wipe of claim 9, wherein said nonionic surfactant is an alkoxylated nonionic surfactant having the formula:

$$RO\text{-}(A)_a H$$

wherein R is a $C_6$ to $C_{22}$ alkyl group; A is an ethoxy, propoxy, or butoxy group; and n is from about 0 to about 20.

11. The premoistened wipe of claim 10, wherein said R is a $C_8$ to $C_{22}$ alkyl group.

12. The premoistened wipe of claim 5, wherein said composition further comprises an organic acid.

13. The premoistened wipe of claim 12, wherein said organic acid is citric acid.

14. The premoistened wipe of claim 5, wherein said surfactant system comprises a nonionic surfactant and an ainphoteric surfactant.

15. The premoistened wipe of claim 14, wherein said nonionic surfactant is an alkyoxylated surfactant and said amphoteric surfactant is an amine oxide surfactant.

16. A method of treating a surface with a composition, wherein said method comprises the step of contacting said surface with a premoistened wipe according to claim 5.

* * * * *